L. H. FRINK.
IRRIGATION TILE.
APPLICATION FILED MAR. 15, 1911.
1,138,370.
Patented May 4, 1915.
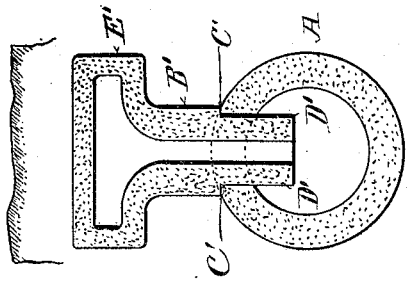
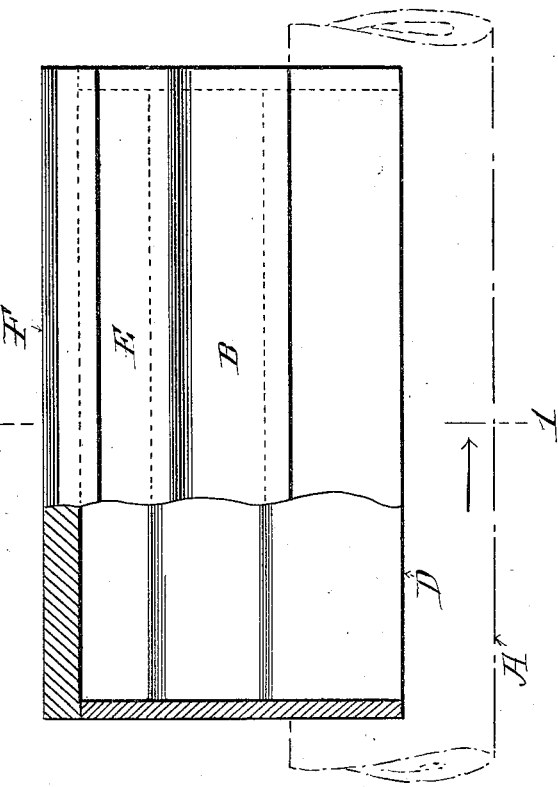
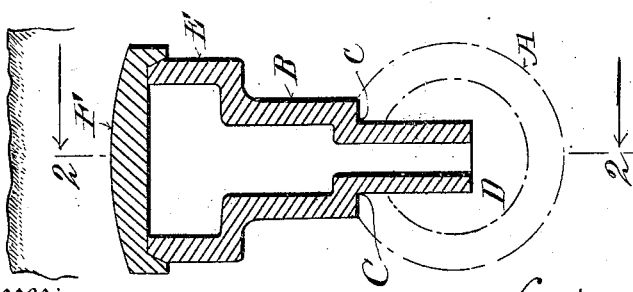
Witnesses:
Inventor
Lucius H. Frink
By his Attorney
Samuel E. Darby

UNITED STATES PATENT OFFICE.

LUCIUS H. FRINK, OF ROCK ISLAND, ILLINOIS.

IRRIGATION-TILE.

1,138,370.   Specification of Letters Patent.   Patented May 4, 1915.

Application filed March 15, 1911.   Serial No. 614,566.

*To all whom it may concern:*

Be it known that I, LUCIUS H. FRINK, a citizen of the United States, residing at Rock Island, county of Rock Island, and State of Illinois, have made a certain new and useful Invention in Irrigation-Tiles, of which the following is a specification.

This invention relates to irrigation tiles, and particularly to means for irrigating, draining or fertilizing certain desired areas of land.

The object of the invention is to provide a tile construction adapted to be buried in the ground and capable of supplying water to the earth in the vicinity thereof for irrigation purposes or for draining the surrounding earth or for efficiently supplying fertilizer to the earth in its vicinity.

A further object of the invention is to provide a construction of tile for the purposes specified, which is economical to manufacture, where the irrigating, draining or fertilizing operations are accomplished through capillary attraction, and which, when in position for use will not interfere with the proper cultivation of the area of ground or land affected.

Other objects of the invention will appear more fully hereinafter.

The invention consists substantially in the construction, combination, location and arrangement of parts, all as will be more fully hereinafter set forth, as shown in the accompanying drawings, and finally pointed out in the appended claims.

In the accompanying drawings,—Figure 1 is a view in vertical transverse section on the line 1, 1, Fig. 2 looking in the direction of the arrows, of a tile structure embodying the principles of my invention. Fig. 2 is a view partly in side elevation and partly in vertical central longitudinal section on the line 2, 2, Fig. 1, looking in the direction of the arrows. Fig. 3 is a view similar to Fig. 1, but on a somewhat smaller scale showing a modified arrangement of tile structure embodying the principles of my invention. Fig. 4 is a view in vertical transverse section similar to Fig. 1, but on a smaller scale, showing a form of solid porous tile.

The same part is designated by the same reference sign wherever it occurs throughout the several views.

In carrying out my invention I propose to employ a tile A, and to bury the same in the earth at the point to be irrigated, drained or fertilized. This tile should be of concrete or other suitable material impervious to water. At the point where the irrigation, draining or fertilizing is to be accomplished I provide the tile with a longitudinally extending opening C in the uppermost part thereof. I also provide a hollow supplementary tile portion B, B', of porous material, of the desired length, corresponding to the length of the slot C in the water tight tile A, to be effective for the desired area. This supplementary porous tile is provided with a narrow edge portion D, D', adapted to be received through the longitudinal opening C of the tile A and to project through said opening into the tile A, as clearly shown. The particular shape or contour of the main body part of the hollow auxiliary tile is not of material consequence. I prefer however, to so shape said tile as to present a substantially flat upper surface, and for this purpose I widen out the upper portion E, E', of the porous tile, thereby enabling me to distribute the moisture in irrigating or in fertilizing, or to draw from, in draining, a larger area of ground.

If desired the porous tile may be provided with a removable top or cover F, see Figs. 1 and 2, which should be of porous material, and which is fitted to a seat formed therefor on the upper edge of the porous tile, and held in place thereon in any suitable or convenient manner. By providing this removable cover I am able to inspect, clean or replace the core or remove any sediment which may be collected in the porous core or in the tile A adjacent thereto. The porous core B, B', B² may be secured in the longitudinal slot C, C' of the impervious tile A by cementing the same therein or otherwise as may be most convenient, so as to secure a rigid firm connection of these parts. The narrow open edge portion D, D', of the porous core B, B', should project into the tile A, a sufficient distance to come in contact with the water flowing through said tile, for irrigation or fertilizing purposes. The tile A and its auxiliary porous core portion B, B', may be buried in the ground at the point desired and to any desired depth below the surface of the soil to be irrigated or fertilized or drained. The distance below the surface of the ground to the tile and its porous core will, of course, depend more or less on the contour of the land and the nature of the crops, plants or the like to be grown on the land. By burying the tile and its porous core, all of the surrounding area of the soil may be utilized for cultivating purposes and the use of irrigating ditches or like expedients which will consume in themselves more or less tillable and cultivatable area is avoided. At the same time a most efficient irrigating and fertilizing action is accomplished without undue loss of the water due to evaporation.

It will be seen that the irrigating and fertilizing operation is accomplished by capillary attraction. As long as the edge portion D, D', of the porous tile or core is in contact with water flowing through the tile A the water is absorbed by the porous tile, and is distributed therefrom to the surrounding soil adjacent to the roots of the crop, plants or the like to be supplied. By impregnating the irrigating water or other fluids supplied to the tile A with fertilizing material in liquid form I am enabled to efficiently utilize my tile structure for fertilizing purposes.

For irrigating or fertilizing purposes it is obvious that the water or liquid employed may be supplied to the tile and delivered therein from a reservoir, by a pump or otherwise and by maintaining suitable gates in the tile or pipe line system any particular section of the land may be reached for irrigating or fertilizing purposes or if desired all or several sections of the land may be so reached at the same time, and the supply of water or fertilizing liquid may be regulated at the will of the operator. It will, of course, be understood that the system is to be installed with the proper inclination, and with suitable outlet for the flushing of the system if necessary or desired in order to remove any sediment which might collect in the pipe or tile system.

It is obvious that the system may also be employed for draining flooded or swamped ground, the water seeping through the porous core B, B', in that case into the tile A and being drawn through the latter, this being the reverse of the action involved in irrigating where the moisture seeps from the tile A through the porous core portion and is distributed from the latter, to the surrounding and overlying soil or earth.

Having now set forth the object and nature of my invention, and various constructions embodying the principles thereof, what I claim as new and useful and of my own invention, and desire to secure by Letters Patent, is,—

1. In a tile structure adapted to be buried in the ground for irrigating, fertilizing or draining purposes, a water tight tile having a longitudinally extending slot in the upper part thereof, an auxiliary hollow porous core arranged above and parallel to the tile and having an enlarged upper part and a narrow open lower edge portion extending into the water tight tile through the longitudinal slot therein, and a removable top for the porous core.

2. In a tile structure adapted to be buried in the ground for irrigating, fertilizing or draining purposes, a water tight tile pipe having a longitudinally extending slot in the upper wall thereof, and an auxiliary hollow porous core arranged above and parallel to the water tile pipe, said core being closed at its upper edge and open at its lower edge and extending at its lower edge through the longitudinal slot into the tile.

In testimony whereof I have hereunto set my hand in the presence of the subscribing witnesses, on this 23d day of February A. D. 1911.

LUCIUS H. FRINK.

Witnesses:
EMMA SCHNITZER,
FREDERICK C. SCHNITZER.

Copies of this patent may be obtained for five cents each, by addressing the "Commissioner of Patents, Washington, D. C."